United States Patent [19]
Knittle

[11] Patent Number: 5,758,319
[45] Date of Patent: May 26, 1998

[54] METHOD AND SYSTEM FOR LIMITING THE NUMBER OF WORDS SEARCHED BY A VOICE RECOGNITION SYSTEM

[76] Inventor: Curtis D. Knittle, 1585 S. Pitkin Ave., Superior, Colo. 80027

[21] Appl. No.: 658,339

[22] Filed: Jun. 5, 1996

[51] Int. Cl.$^6$ ........................................ G10L 7/08
[52] U.S. Cl. ............... 704/251; 704/261; 704/254; 704/255; 704/257
[58] Field of Search ........................ 395/2.6, 2.61, 395/2.64, 2.52, 2.65, 2.54, 2.4, 2, 2.55

[56] References Cited

U.S. PATENT DOCUMENTS

| | | | |
|---|---|---|---|
| 4,866,778 | 9/1989 | Baker | 395/2.63 |
| 5,027,406 | 6/1991 | Roberts et al. | 395/2.53 |
| 5,357,596 | 10/1994 | Takebayashi et al. | 395/2.84 |
| 5,384,892 | 1/1995 | Strong | 395/2.52 |
| 5,390,279 | 2/1995 | Strong | 395/2 |
| 5,428,707 | 6/1995 | Gould et al. | 395/2.4 |
| 5,457,768 | 10/1995 | Tsuboi et al. | 395/2.4 |
| 5,548,681 | 8/1996 | Gleaves et al. | 395/2.42 |
| 5,613,036 | 3/1997 | Strong | 395/2.52 |

*Primary Examiner*—David R. Hudspeth
*Assistant Examiner*—Vijay B. Chawan
*Attorney, Agent, or Firm*—Brooks & Kushman, P.C.; Peter J. Kinsella

[57] ABSTRACT

A method and system for limiting the number of words searched by a voice recognition system having a predetermined language model containing a first plurality of words corresponding to all words recognizable by the voice recognition system in a predetermined application having at least one mode. The predetermined language model includes a list of all states that correspond to each of the first plurality of words. Based on the current mode of the application of the voice recognition system a subvocabulary of active words containing a second plurality of the first plurality of words is determined. A signal identifying the subvocabulary of active words is transferred to a recognizer which turns on only those states in the predetermined language model corresponding to the active words. Finally, a search is performed on a portion of the predetermined language model according to the subvocabulary of active words so that the computation time of the voice recognition system is reduced.

12 Claims, 3 Drawing Sheets

5,758,319

METHOD AND SYSTEM FOR LIMITING THE NUMBER OF WORDS SEARCHED BY A VOICE RECOGNITION SYSTEM

TECHNICAL FIELD

This invention relates to a method and system for improving the performance of a voice recognition system by limiting the number of words searched by the voice recognition system.

BACKGROUND ART

Voice recognition is a broad term that includes both recognition of the speech content, referred to as speech recognition, and recognition of the speaker, referred to as speaker recognition. Voiced recognition technology can be applied to communication-based information processing in tasks such as bank-by-phone, access to information databases, access to voice mail, etc. Telephone systems are primary components of such processes.

An essential step in voice recognition processes is the comparison of some representation of test speech, referred to as a test speech representation, to a reference representation of the speech, referred to generically as reference speech representations. In the context of voice recognition, reference speech representations are referred to as word models which are stored in a memory. Test speech is the speech uttered by the user which is to be recognized. If the two representations match, the test speech is said to correspond to the matched reference speech representation. These various representations are generally some transformation of the speech. For example, the word models for the reference speech representations may be parametric representations in the form of Linear Predictive Coding (LPC) coefficients.

Voice recognition generally includes a training procedure and a test procedure. In the training procedure, a training database made up of known speech is analyzed to produce the reference speech representations. The training database typically comprises predetermined speech from one or many different speakers. From the training database, a suitable method is used to produce the reference speech representations. The test procedure involves the step of comparing the test speech representation with the reference speech representation. During the speech recognition process, a spoken test speech is analyzed to produce a representation of the test speech compatible with the reference speech representation. The test speech representation for speech recognition is then compared to the reference speech representations to find the closest matched reference speech representation.

In a typical voice recognition system, the reference speech representations are constrained to a set of vocabulary words that the voice recognition system is expected to recognize. That is, a user's speech input is classified according to the predefined vocabulary of words. A software program is utilized which accepts as input the vocabulary words formatted in regular ASCII text, looks up the phonetic pronunciation of the words, and provides as output a search structure commonly referred to as a tree or language model. The language model can be formed by simply presenting a new list of words, generating the new language model and downloading the language model to the voice recognition system.

A particular part of an application may not need the entire vocabulary, but only a subset of it. In this case, either the entire vocabulary can be searched and only the subset of valid words are acted upon, or a new search can be loaded containing only those valid words. Both methods have serious drawbacks. In the first method, even if only a single word is desired, the entire vocabulary is searched resulting in slow runtime and the possibility that the desired word is removed because of lower than average scores relative to the other, undesired words.

The second method forces the application to generate a language model dynamically during the application, and then load the new language model to the algorithm. Such a method is disclosed in U.S. Pat. No. 5,384,892 issued to Strong. Strong discloses a method of generating a new language model based on the current mode of the application. The new language model is downloaded into the memory of the voice recognition system for each recognition attempt. This process may be time-consuming, depending on the number of words to be recognized, the speed of the processor, and the amount of RAM (Random Access Memory) and, thus, lead to delays in the application response time. Additionally, the language model normally requires a large amount of memory which has to be transferred to the voice recognition system.

DISCLOSURE OF THE INVENTION

It is thus a general object of the present invention to provide a method and system for improving the performance of a voice recognition system.

It is another object of the present invention to provide a method and system for limiting the number of words to be recognized by a voice recognition system based on the current mode of the application of the voice recognition system.

In carrying out the above objects and other objects, features and advantages, of the present invention, a method is provided for improving the recognition of a speech input into a voice recognition system having a predetermined language model containing a first plurality of words corresponding to all words recognizable by the voice recognition system in a predetermined application having at least one mode. The method includes determining a current mode of the application of the voice recognition system. The method also includes determining a subvocabulary of active words containing a second plurality of the first plurality of words based on the current mode of the application. Still further, the method includes performing a search on the subvocabulary of active words in order to recognize the speech input with minimum computation time.

In further carrying out the above objects and other objects, features and advantages, of the present invention, a system is also provided for carrying out the above described method. The system includes means for determining a current mode of the application of the voice recognition system. The system also includes means for determining a subvocabulary of active words containing the second plurality of the first plurality of words based on the current mode of the application. Still further, the system includes means for performing a search on the subvocabulary of active words so as to reduce the computation time of the voice recognition system.

The above objects and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
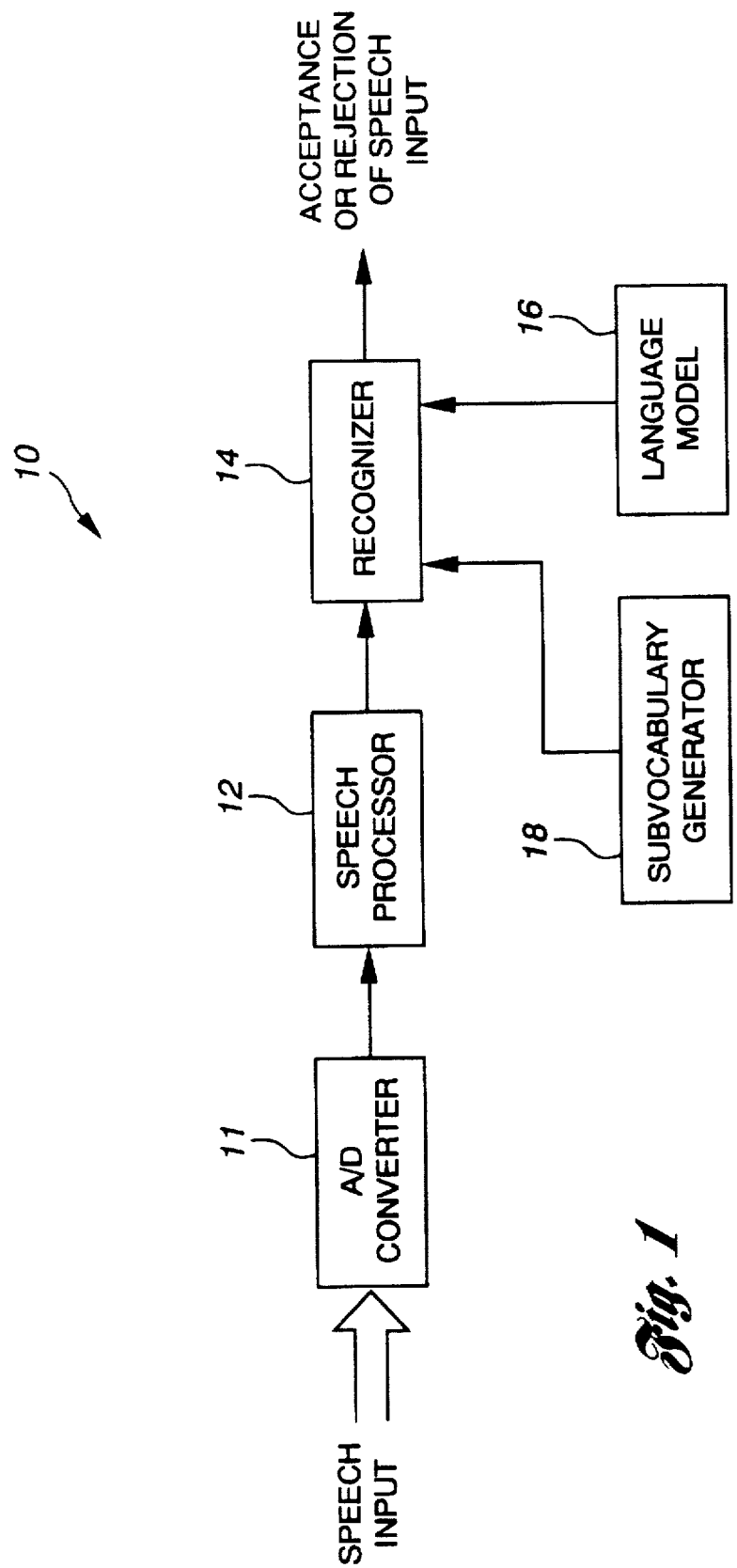
FIG. 1 is a block diagram of the system of the present invention.

With reference to FIG. 1, there is shown a block diagram of a voice recognition system of the present invention, denoted generally by reference numeral 10. The system 10 includes an analog-to-digital converter 11 for converting an analog speech input into digitized sound signals. The digitized sound signals are input to a signal processor 12, otherwise known as the "front end" of the speech recognition system 10, for performing a feature extraction process. This feature extraction process recognizes acoustic features of human speech as distinguished from other sound signal information contained in digitized sound signals. In this manner, features such as phones or other discrete spoken speech units may be extracted and analyzed to determine whether words are being spoken.

The acoustic features from the speech feature extraction process are input to a recognizer 14 which performs a search in a vocabulary recognizable by the voice recognition system 10 to determine whether the extracted features represent expected words in the vocabulary. The vocabulary or the words which the recognizer 14 will search are contained in a predetermined language model 16. However, the words which the recognizer 14 will search are limited by a sub-vocabulary generator 18, i.e., a processor, which determines the current mode of the application and determines a sub-vocabulary of active words accordingly. Thus, the recognizer 14 searches only a portion of the predetermined language model 16, i.e. the active words of the language model 16.

Prior to describing the method of the present invention, a description of a typical language model 16 will be described. The language model 16 is constructed prior to the recognition process and contains models of words specific to the application in which the voice recognition system 10 will be used. All words are made up of phonemes, i.e., basic speech sounds, and can be represented as a phoneme string. Consider a simple example in which the words "bag," "cop" and "bat" were the only words recognizable by the voice recognition system 10 and contained in the language model 16. The word "bag" may have the following transcription:

bag <---> bc bh @ gc g, where the letters "bc", "bh", "@", "gc" and "g" each represent a specific phoneme. The word "cop" may have the following transcription:

cop <---> kc kh A pc ph, and the word "bat" may have the following transcription:

bat <---> bc bh @ tc th.

Figure 2:
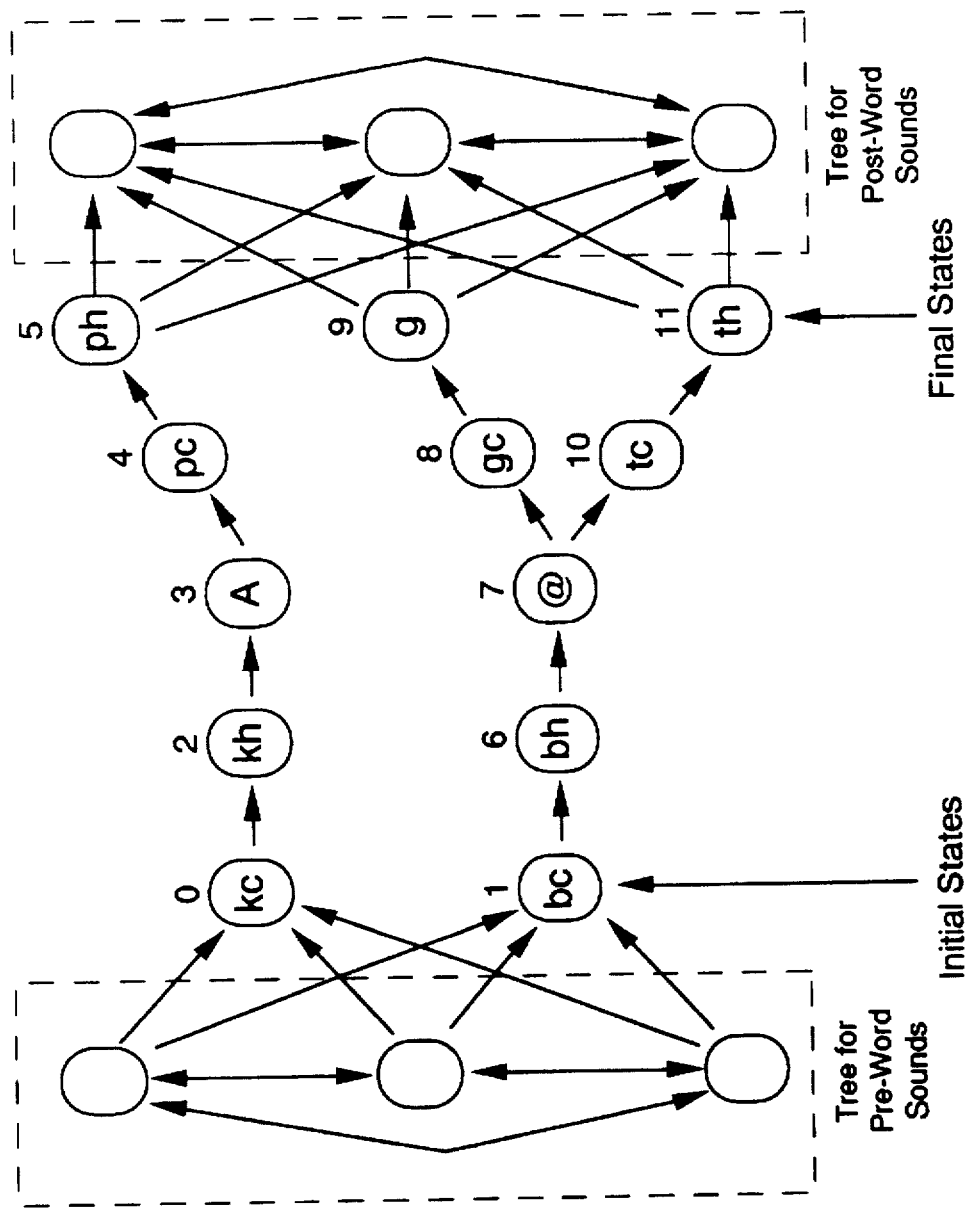
FIG. 2 is an example of a search tree comprising the words contained in a predetermined language model.

A search tree for the language model 16 containing the words described in the above example is shown in FIG. 2. To facilitate keyword spotting, the tree contains three sections: a pre-word tree classifies sounds prior to the keyword; a word tree models and classifies the words in the vocabulary; and a post-word tree classifies sounds after the keyword. The pre-word and post-word trees resemble ergodic hidden Markov models. That is, any state can transition to any other state in a single step. Furthermore, any state in the pre-word tree can transition only to the initial states in the word tree, and only final states in the word tree can transition to any state in the post-word tree. Collectively, the three trees are referred to as the search tree.

The "Initial States" are simply the first phonemes of the words in the vocabulary. The "Initial States" can be shared, as in "bag" and "bat". The "Final States" are the last states in a word and cannot be shared. The remaining states, sometimes referred to as "Middle States", represent the phonemes in the words that are not initial or final. Transitions between states in the word tree are constrained by the word models.

The "current state" is the state currently being updated. The "next states" are the set of states that the current state can transition to. Initial and middle states have at least one next state, while final states may not have any next states. Even though the final states transition to states in the post-word tree, these states are not considered next states of a final state.

One can see from the search tree shown in FIG. 2 that large amounts of information are required to represent the word models. Information regarding which phoneme the state models, which states are next states of a state, whether a state is an initial, middle, or final state, duration parameters if duration modeling is used, scores, entry times, etc., are generally required. Those skilled in the art will recognize the aforementioned list could include other information. In the present invention, another piece of information required for each state is whether a state is turned on or off. On/off information can be represented in a separate "on/off" variable, or it may be combined with other variables to conserve memory. Normally, this information is organized using a "C" structure.

The language model 16 generates several different data segments used by the recognizer 14. These include general search parameters, pre-word tree information, word tree information, post-word tree information, next state information, ASCII representation of words in the tree, and a list of word tree states belonging to each word. This information is typically organized using a "C" structure.

Figure 3:
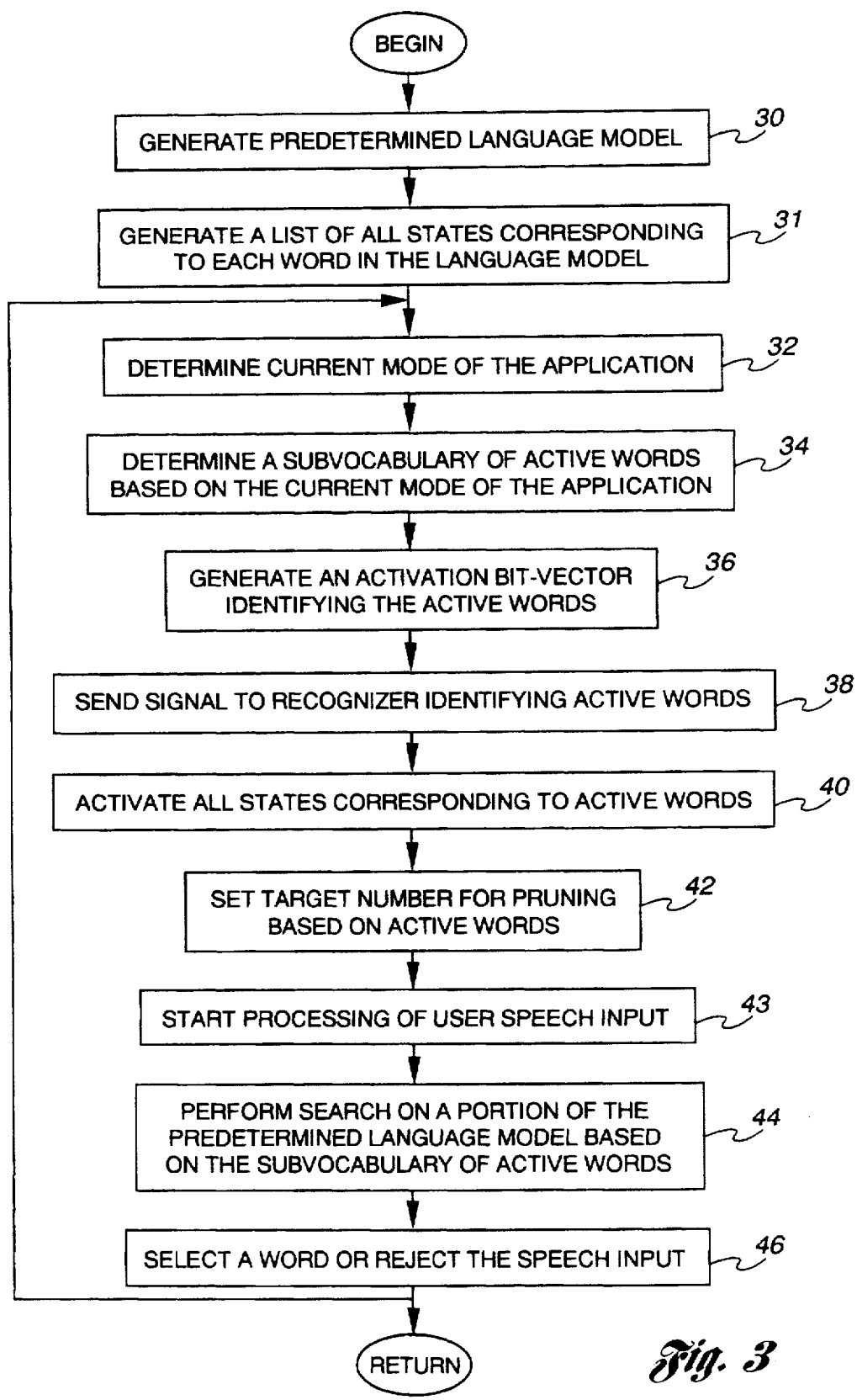
FIG. 3 is a flow diagram illustrating the operation of the present invention.

Turning now to FIG. 3, there is shown a flow diagram illustrating the method of the present invention in limiting the search performed by the recognizer 14. Prior to operation of the present invention, a language model 16 as discussed above is generated for the voice recognition system, as shown at block 30. Also, information is required that relates a word with its corresponding states. Thus, a list of all states corresponding to each of the words contained in the language model 16 is generated, as shown in block 31. This list is contained in the last data segment of the language model 16. The following describes the format of this data segment. The words and states in the word tree are inherently numbered based on how they are encountered in the language model 16. For example, the first word is 0, the second word is 1, etc. Similarly, the first state is 0, the second state is 1, etc. Thus, the last data segment in the language model lists the state numbers that correspond to word 0, followed by a "−1", followed by the state numbers that correspond to word 1, followed by a "−1", etc., where "−1" is used to delineate words.

For example, using the word tree shown in FIG. 2, the information in the last data segment of the language model 16 would look like the following:

0 2 3 4 5 −1 6 7 8 9 −1 1 6 7 10 11 −1, where word 0 ("cop") includes states 0, 2, 3, 4 and 5, word 1 ("bag") includes states 1, 6, 7, 8 and 9 and word 2 ("bat") includes states 1, 6, 7, 10 and 11. The numbers listed above corresponding to the states can be seen above the circles in the search tree shown in FIG. 2. Blocks 30 and 31 are, thus, performed only once for the voice recognition system 10.

Prior to receiving a speech input from a user, the subvocabulary generator 18 determines the current mode of the application of the voice recognition system 10, as shown at block 32. For example, many applications using voice recognition require the confirmation of information. During the confirmation mode of the application, only the words "yes" or "no" are needed, and, therefore, only the models for "yes" and "no" need to exist in the search structure. If the search structure contains many other words, e.g., 50, in addition to "yes" and "no", then the runtime performance of the voice recognition system 10 degrades significantly and the other 50 words interfere with the two words that are valid.

Similarly, the method and system of the present invention can be used to limit the search of the language model 16 based on the identification of the user. For example, a user may subscribe to an application providing many services through the use of voice recognition, such as a voice access service that allows a user to control their network services using their voice. A user could say "last call return" to activate last call return service. However, if the user did not subscribe to the last call return service, then that service name is not included in the subvocabulary, i.e., even though "last call return" is in the language model 16, it is not activated for users that do not subscribe to the service. This information is obtained after the user establishes a connection with the application and provides a user identification signal, such as a PIN (personal identification number), or their calling number is identified.

The subvocabulary generator 18 then determines which words contained in the language model 16 should be active and determines a subvocabulary, as shown at block 34. That is, only those words that are specific to the current mode of the application need to be searched.

The output of the subvocabulary generator 18 is an activation bit-vector indicating which words of the language model 16 are to be turned on based on the current mode of the application, as shown at block 36. This activation bit-vector is downloaded to the recognizer 14 for use in initializing the language model 16. For example, if the subvocabulary generator 18 determines that only the word "bag" should be activated based on the current mode of the application, an activation bit-vector such as (0,1,0) is generated. In this case, only states 1, 6, 7, 8 and 9 will be turned on because these are the states corresponding to word 1, "bag." Even though the word "bat" is turned off, the states 1, 6 and 7 will still be turned on because they are common states belonging to "bag." However, the search will never transition into state 10 because it will be turned off. The search can transition into state 8 because it will be turned on.

The subvocabulary generator 18 then sends the activation bit-vector representing the subvocabulary of active words to the recognizer 14, as shown at block 38. After the subvocabulary generator 18 sends the activation bit-vector to the recognizer 14, the recognizer 14 activates the corresponding states, as shown at block 40. The active states are turned on by setting an appropriate variable in the structure of each word tree state. For example, if an integer variable called "on/off" is declared for each state in the word tree, then active states can be indicated by setting on/off=1, and inactive states can be indicated by setting on/off=0. Alternatively, on-off information can be manifested in another variable to conserve memory. For example, if a variable exists for each state that indicates the frame number that the state was entered, this variable could conveniently be used to indicate on-off information. If a state is turned off, the "entry" variable could be initialized to −1, while if a state is turned on, the "entry" variable could be initialized to 0. The on-off condition is checked when the recognizer 14 begins looking at the current state's next state.

After turning the active states on, the target number of active states for pruning is set based on the number of states actually turned on, as shown at block 42 of FIG. 3. Pruning is a known technique used to remove from the linked list those states that have a relatively poor score and are not likely the word being spoken. It is a technique used to improve search processing time by removing low-scoring states. There is a distinct difference between states that have been pruned and states that are turned off. Pruned states can re-enter the linked list while states that are turned off can never enter the linked list. Pruning parameters are stored in the language model 16 and normally include a number indicating the desired percentage of the total number of states turned on that will remain unpruned. Since the actual number of states turned on varies from recognition attempt to recognition attempt, the target number of active states is obtained by multiplying the desired percentage by the total number of states actually turned on for each recognition attempt.

After turning the active states on and determining the target number of active states for pruning, the recognizer 14 is ready to start processing a speech input from the user and search only a portion of the predetermined language model 18, as shown at blocks 43 and 44. The recognizer 14 accomplishes this by determining whether a possible "next" state of the "current" state of a word is turned "on." Only those states corresponding to the active words are updated while the states belonging to inactive words are never entered. Thus, the same search tree is used regardless of the number of active words, but the search proceeds as though the search tree only contained the active words. The processing time is then directly proportional to the number of active words (or states), and the only information required is a bit vector whose length equals the total number of words in the language model 16.

By definition, the current state must be in the linked list, otherwise it would not be updated. A state's next state is not necessarily in the linked list because it may be turned off or has been pruned. If a transition occurs between a state and a next state, then the next state is added to the linked list. A transition is allowed, however, only if the next state is turned on. Referring again to FIG. 2, assume the current state is "@". The state "@" has two next states, "gc" and "tc." The search algorithm of the recognizer 14 checks whether the next state of the current state is turned on. If the state is turned off, the algorithm skips this next state. If the state is turned on, then a comparison of scores is performed. If a transition is allowed, the next state is added to the linked list. Therefore, it is necessary for the state to be turned on before it can be added to the linked list.

The recognizer 14 is then able to compare the speech input with the active words rather than all of the words contained in the language model 16 so as to minimize the processing time of the speech recognition system 10. Finally, the recognizer 14 generates an output indicating whether a word from the predetermined language model 16 has been selected or the speech input has been rejected, as shown at block 46.

The subvocabulary generation of the present invention specifies a subset of a larger language model potentially containing all words that are needed in a particular application, leaving the remaining words turned off. Not only does a word get turned off, but all states solely associated with that word are turned off. Hence, the runtime performance is directly proportional to the number of active words, and the search dynamics proceed as though only the active words existed.

While the best modes for carrying out the invention have been described in detail, those familiar with the art to which this invention relates will recognize various alternative designs and embodiments for practicing the invention as defined by the following claims.

What is claimed is:

1. A method for limiting the number of words searched by a voice recognition system on a user speech input, the voice recognition system having a predetermined language model containing a first plurality of words corresponding to all words recognizable by the voice recognition system in a predetermined application having at least one mode, wherein the predetermined language model further including a list of all states corresponding to each of the first plurality of words contained in the predetermined language model, the method comprising:

determining a current active mode of the application of the voice recognition system;

determining a subvocabulary of active words containing a second plurality of the first plurality of words based on the current active mode of the application; and performing a search on the subvocabulary of active words so as to reduce the computation time of the recognition of the user speech input.

2. The method as recited in claim 1 wherein determining the subvocabulary of active words further comprises generating an activation bit-vector having a plurality of bits corresponding to each of the first plurality of words contained in the predetermined language model, the plurality of bits for identifying the active words.

3. The method as recited in claim 2 wherein generating the activation bit-vector further comprises turning on the states corresponding to each of the second plurality of words that have been identified as active words.

4. The method as recited in claim 3 wherein the states corresponding to each of the active words include a "current" state and "next" state and wherein performing the search includes determining whether the "next" state of the "current" state is turned on.

5. The method as recited in claim 3 wherein the predetermined language model includes a desired percentage of the first plurality of words that will remain unpruned by the voice recognition system, and wherein determining the subvocabulary includes determining a target number of the active words for pruning based on the desired percentage and the number of states actually turned on.

6. The method as recited in claim 1 wherein determining the subvocabulary of active words includes determining an identification of the user, the user having predetermined active words assigned thereto.

7. A system for limiting the number of words searched by a voice recognition system on a user speech input, the voice recognition system having a predetermined language model containing a first plurality of words corresponding to all words recognizable by the voice recognition system in a predetermined application having at least one mode, wherein the predetermined language model further including a list of all states corresponding to each of the first plurality of words contained in the predetermined language model, the system comprising:

means for determining a current active mode of the application of the voice recognition system;

means for determining a subvocabulary of active words containing a second plurality of the first plurality of words based on the current active mode of the application; and means for performing a search on the subvocabulary of active words so as to reduce the computation time of the recognition of the user speech input.

8. The system as recited in claim 7 wherein the means for determining the subvocabulary of active words further comprises means for generating an activation bit-vector having a plurality of bits corresponding to each of the first plurality of words contained in the predetermined language model, the plurality of bits for identifying the active words.

9. The system as recited in claim 8 wherein the means for generating the activation bit-vector further comprises means for turning on the states corresponding to each of the second plurality of words that have been identified as active words.

10. The system as recited in claim 9 wherein the states corresponding to each of the active words include a "current" state and "next" state and wherein the means for performing the search includes means for determining whether the "next" state of the "current" state is turned on.

11. The system as recited in claim 9 wherein the predetermined language model includes a desired percentage of the first plurality of words that will remain unpruned by the voice recognition system, and wherein the means for determining the subvocabulary includes means for determining a target number of the active words for pruning based on the desired percentage and the number of states actually turned on.

12. The system as recited in claim 7 wherein the means for determining the subvocabulary of active words includes means for determining an identification of the user, the user having predetermined active words assigned thereto.

\* \* \* \* \*